US010679595B2

(12) United States Patent
     Lavineway

(10) Patent No.: US 10,679,595 B2
(45) Date of Patent: Jun. 9, 2020

(54) APPARATUS FOR SUPPORTING MUSICAL INSTRUMENTS

(71) Applicant: Sheldon Lavineway, Surrey (CA)

(72) Inventor: Sheldon Lavineway, Surrey (CA)

(*) Notice: Subject to any disclaimer, the term of this patent is extended or adjusted under 35 U.S.C. 154(b) by 0 days.

(21) Appl. No.: 16/345,108

(22) PCT Filed: Oct. 27, 2017

(86) PCT No.: PCT/CA2017/051284
    § 371 (c)(1),
    (2) Date: Apr. 25, 2019

(87) PCT Pub. No.: WO2018/094505
    PCT Pub. Date: May 31, 2018

(65) Prior Publication Data
    US 2019/0287500 A1    Sep. 19, 2019

Related U.S. Application Data

(60) Provisional application No. 62/414,452, filed on Oct. 28, 2016.

(51) Int. Cl.
    *G10G 5/00*    (2006.01)
    *G01G 5/00*    (2006.01)
(52) U.S. Cl.
    CPC ................. *G10G 5/00* (2013.01); *G01G 5/00* (2013.01)
(58) Field of Classification Search
    CPC ........................................................ G10G 5/00
    See application file for complete search history.

(56) References Cited

U.S. PATENT DOCUMENTS

| | | | | | |
|---|---|---|---|---|---|
| 831,766 A | * | 9/1906 | Bing | ..................... | A47B 19/002 248/461 |
| 1,045,583 A | * | 11/1912 | Mills | ........................ | G10G 5/00 211/85.6 |
| 1,060,861 A | * | 5/1913 | Schulte | .................. | F16M 11/22 248/167 |
| 1,464,279 A | * | 8/1923 | Hindley | ............... | F16M 11/041 248/125.1 |
| 1,646,305 A | * | 10/1927 | Meyers | ..................... | G09F 1/14 40/603 |

(Continued)

FOREIGN PATENT DOCUMENTS

| CN | 204130160 U | 1/2015 |
|---|---|---|
| GB | 2293910 A | 4/1996 |

OTHER PUBLICATIONS

International Search Report and Written Opinion for PCT/CA2017/051284, International Searching Authority, dated Feb. 13, 2018.

*Primary Examiner* — Robert W Horn
(74) *Attorney, Agent, or Firm* — Dentons Canada LLP

(57) ABSTRACT

An apparatus for supporting a musical instrument comprises a stand comprising a plurality of legs comprising a forward leg and two rear legs, and a center block having a plurality of apertures for receiving the legs. Each of the legs comprises a top end and a bottom end. The legs are pivotally attached to the center block and held within the apertures, and the apertures are shaped such that the legs are moveable between a folded configuration and a splayed arrangement wherein the bottom ends of the rear legs are laterally displaced and the bottom end of the forward leg is forwardly displaced.

15 Claims, 5 Drawing Sheets

(56) References Cited

U.S. PATENT DOCUMENTS

| | | | | |
|---|---|---|---|---|
| 1,907,238 A * | 5/1933 | Blondin | G10G 5/00 | 84/327 |
| 2,473,351 A * | 6/1949 | Thompson | F16B 7/1427 | 248/188.5 |
| 2,524,518 A * | 10/1950 | Darcy | G10G 5/00 | 84/411 R |
| 2,547,924 A * | 4/1951 | Citro | G10G 5/00 | 84/327 |
| 2,559,200 A * | 7/1951 | Schaf | G10G 5/00 | 84/267 |
| 2,613,901 A * | 10/1952 | Tatar | G10G 5/00 | 248/167 |
| 2,630,289 A * | 3/1953 | Selig | G10G 5/00 | 248/169 |
| 2,796,795 A * | 6/1957 | Bach | G10D 1/08 | 84/173 |
| 3,173,642 A * | 3/1965 | Greenspan | G10G 5/00 | 248/170 |
| 4,047,684 A * | 9/1977 | Kobayashi | F16C 11/10 | 248/122.1 |
| 4,311,294 A * | 1/1982 | Hawley | F16M 11/16 | 211/205 |
| 4,529,865 A * | 7/1985 | Oakes, Jr. | G10G 5/00 | 219/201 |
| 4,582,282 A * | 4/1986 | Gracie | G10G 5/00 | 248/167 |
| 4,671,479 A | 6/1987 | Johnson et al. | | |
| 4,690,363 A * | 9/1987 | Koves | A47B 97/08 | 248/163.1 |
| 4,693,161 A * | 9/1987 | Uhrig | G10G 5/00 | 84/291 |
| 4,712,756 A * | 12/1987 | Kester | F16M 11/38 | 248/125.1 |
| 4,934,638 A * | 6/1990 | Davis | A47C 4/286 | 108/118 |
| 5,029,796 A * | 7/1991 | Schoenig | G10G 5/00 | 248/166 |
| 5,197,701 A * | 3/1993 | Olson | G10G 5/00 | 248/166 |
| 5,337,996 A * | 8/1994 | Kalish | A47B 97/04 | 248/448 |
| 5,383,634 A * | 1/1995 | Liao | G10G 5/00 | 248/166 |
| 6,005,176 A * | 12/1999 | Yu | G10G 5/00 | 248/443 |
| 6,202,974 B1 * | 3/2001 | Rellinger | A47B 97/08 | 248/165 |
| 6,283,421 B1 | 9/2001 | Eason et al. | | |
| 6,695,268 B1 * | 2/2004 | Hsieh | A47B 19/002 | 248/188.7 |
| 6,881,884 B2 | 4/2005 | Hsieh | | |
| 7,291,775 B2 | 11/2007 | Yu | | |
| 7,622,662 B2 * | 11/2009 | Shaper | G10D 1/00 | 84/267 |
| 7,717,378 B2 * | 5/2010 | Yu | G10G 5/00 | 248/166 |
| 9,228,695 B2 * | 1/2016 | Cyr | F16G 11/14 | |
| 9,305,529 B1 * | 4/2016 | Paounov | G10D 1/08 | |
| 2004/0182984 A1 * | 9/2004 | Sandkuhl | G10G 5/00 | 248/443 |
| 2012/0012717 A1 * | 1/2012 | Mason | G10G 5/00 | 248/122.1 |
| 2012/0074270 A1 * | 3/2012 | Pays | G10D 1/005 | 248/121 |
| 2016/0131303 A1 | 5/2016 | Hubbs | | |
| 2019/0287500 A1 * | 9/2019 | Lavineway | G10G 5/00 | |

\* cited by examiner

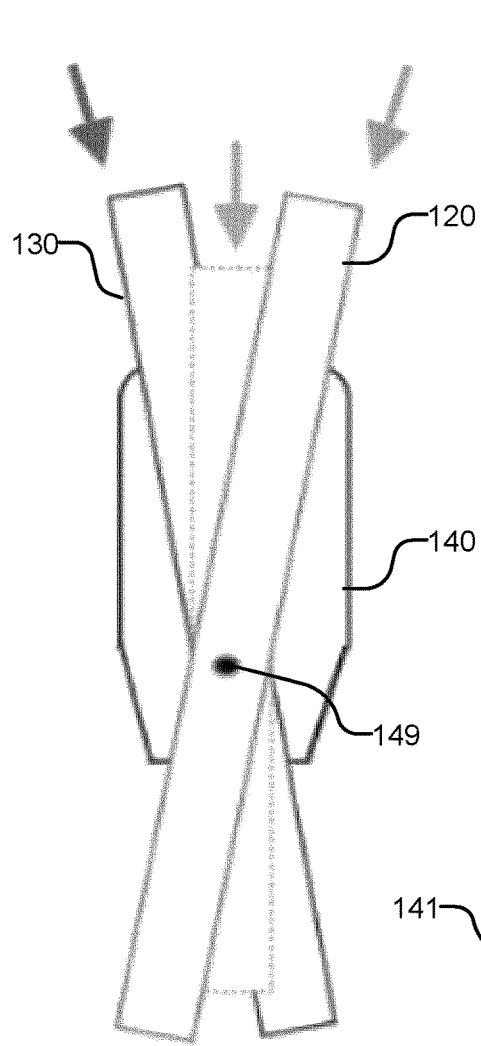
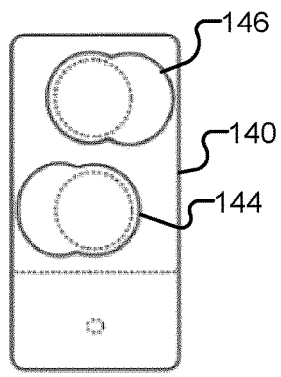
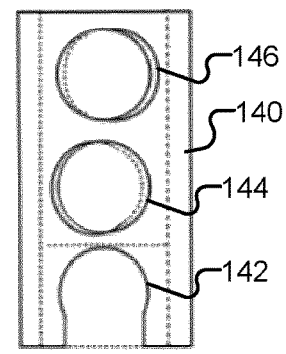
FIG. 2A                FIG. 2B
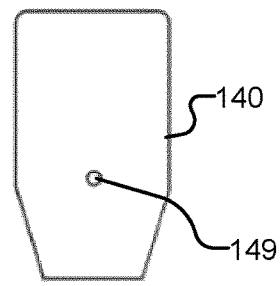
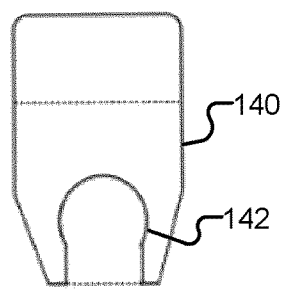
FIG. 2C                FIG. 2D
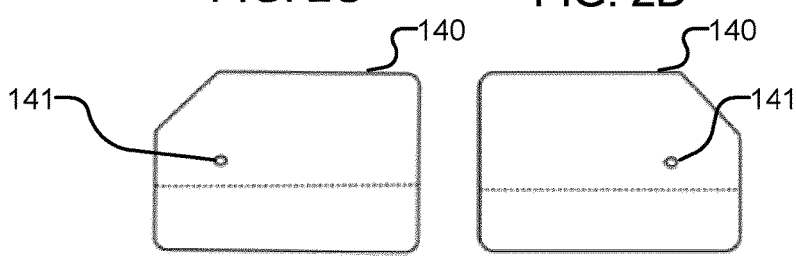
FIG. 2E                FIG. 2F
FIG. 2

APPARATUS FOR SUPPORTING MUSICAL INSTRUMENTS

CROSS-REFERENCE TO RELATED APPLICATION

This application claims the benefit of priority of U.S. Provisional Patent Application No. 62/414,452 filed on Oct. 28, 2016, which is hereby incorporated herein by reference in its entirety.

TECHNICAL FIELD

The present disclosure relates to musical instrument stands.

BACKGROUND

Musicians often have need of a stable place to put down their instruments, whether for taking a break, switching to another instrument, or other reasons. Various types of stands for holding musical instruments are known in the art. Examples include U.S. Pat. Nos. 4,671,479, 5,197,701, 6,005,176, 6,283,421, 6,881,884, and 7,291,775.

The inventor has determined a need for improved apparatus for supporting musical instruments.

SUMMARY

One aspect of the invention provides an apparatus for supporting a musical instrument comprising a stand comprising: a plurality of legs comprising a forward leg and two rear legs, each of the legs comprising a top end and a bottom end, and a center block having a plurality of apertures for receiving the legs. The legs are pivotally attached to the center block and held within the apertures, and the apertures are shaped such that the legs are moveable between a folded configuration and a splayed arrangement wherein the bottom ends of the rear legs are laterally displaced and the bottom end of the forward leg is forwardly displaced.

The legs may comprise collapsible legs. Each collapsible leg may comprise a plurality of leg segments with a stretchable cord running therethrough. Each collapsible leg may comprise a telescoping leg.

An instrument support may be attached to the bottom end of the forward leg. The instrument support may comprise a case for carrying the stand. The case may comprise a leg pouch configured to receive the bottom end of the forward leg. The bottom end of the forward leg may be paddle-shaped such that the forward leg is non-rotatable with respect to the case when the bottom end of the forward leg is inserted into the leg pouch. A strap may be provided for releasably connecting the center block to the case. The top ends of the two rear legs may extend upwardly past the center block and cross when in the splayed configuration.

The center block may have a first aperture for receiving the forward leg, a second aperture for receiving one of the rear legs, and a third aperture receiving the other of the rear legs. Each of the first, second and third apertures may comprise a first bore shaped for holding a respective leg in the folded configuration, a second bore at an angle to the first bore and shaped for holding the respective leg in the splayed configuration, and an intermediate portion between the first and second bores shaped slightly smaller than the respective leg such that the material of the center block deforms slightly as the respective leg moves between the folded and splayed configurations.

Further aspects of the invention and details of example embodiments are set forth below.

DRAWINGS

The following figures set forth embodiments in which like reference numerals denote like parts. Embodiments are illustrated by way of example and not by way of limitation in the accompanying figures.

FIG. 2 schematically illustrates positions of the rear legs of the stand in relation to the center block.

FIGS. 2A-F are respectively top, bottom, rear, front, right and left views of an example center block.

Figure 3:
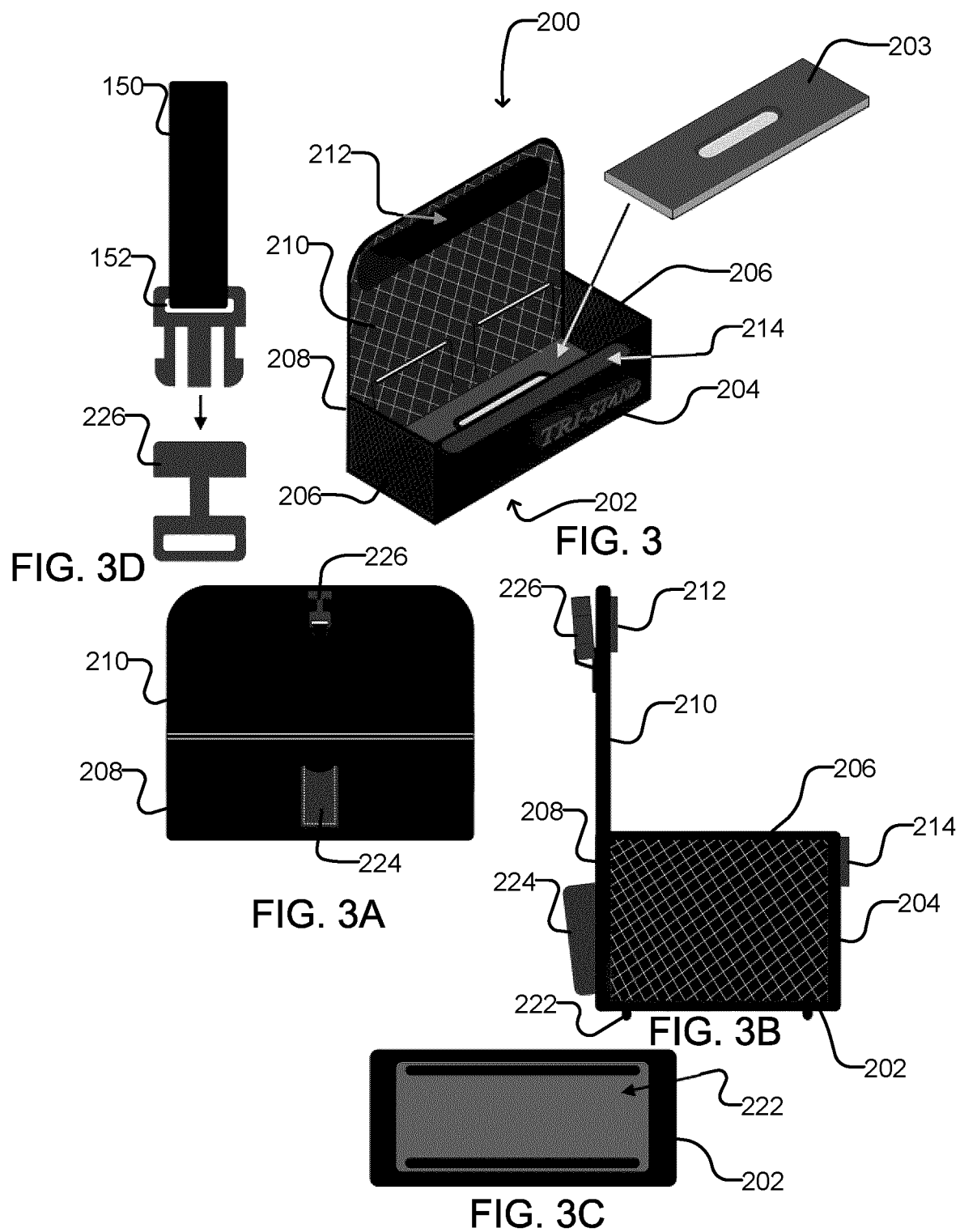

FIG. 3 shows an example case in isolation.

FIGS. 3A-C are respectively rear, side and bottom view of the example case.

FIG. 3D shows the female clip portion on the lid of the case and male clip portion on the strap in isolation.

Figure 4:
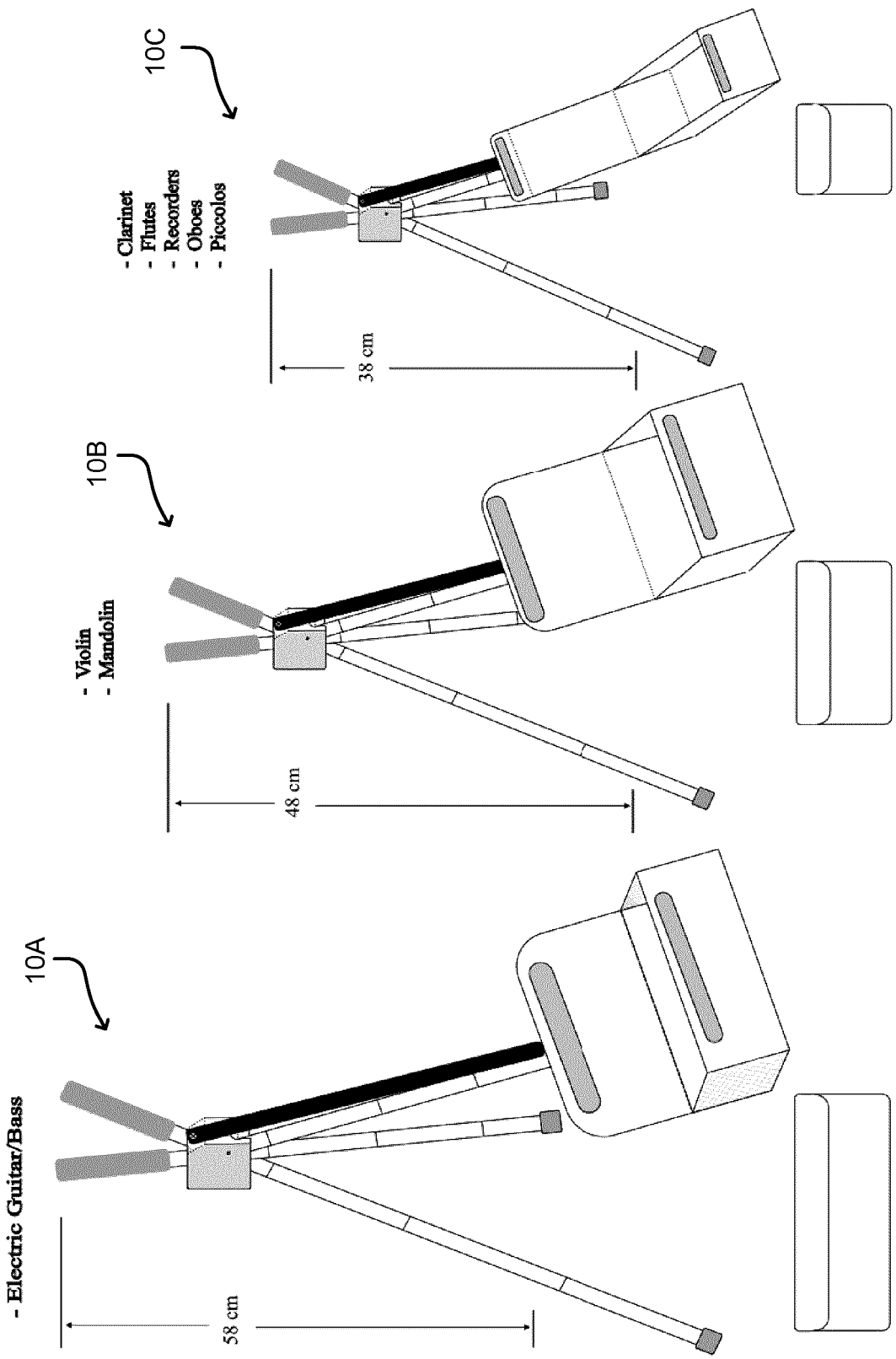

FIG. 4 shows apparatus according to various embodiments of the present disclosure configured to support different instruments.

Figure 5:
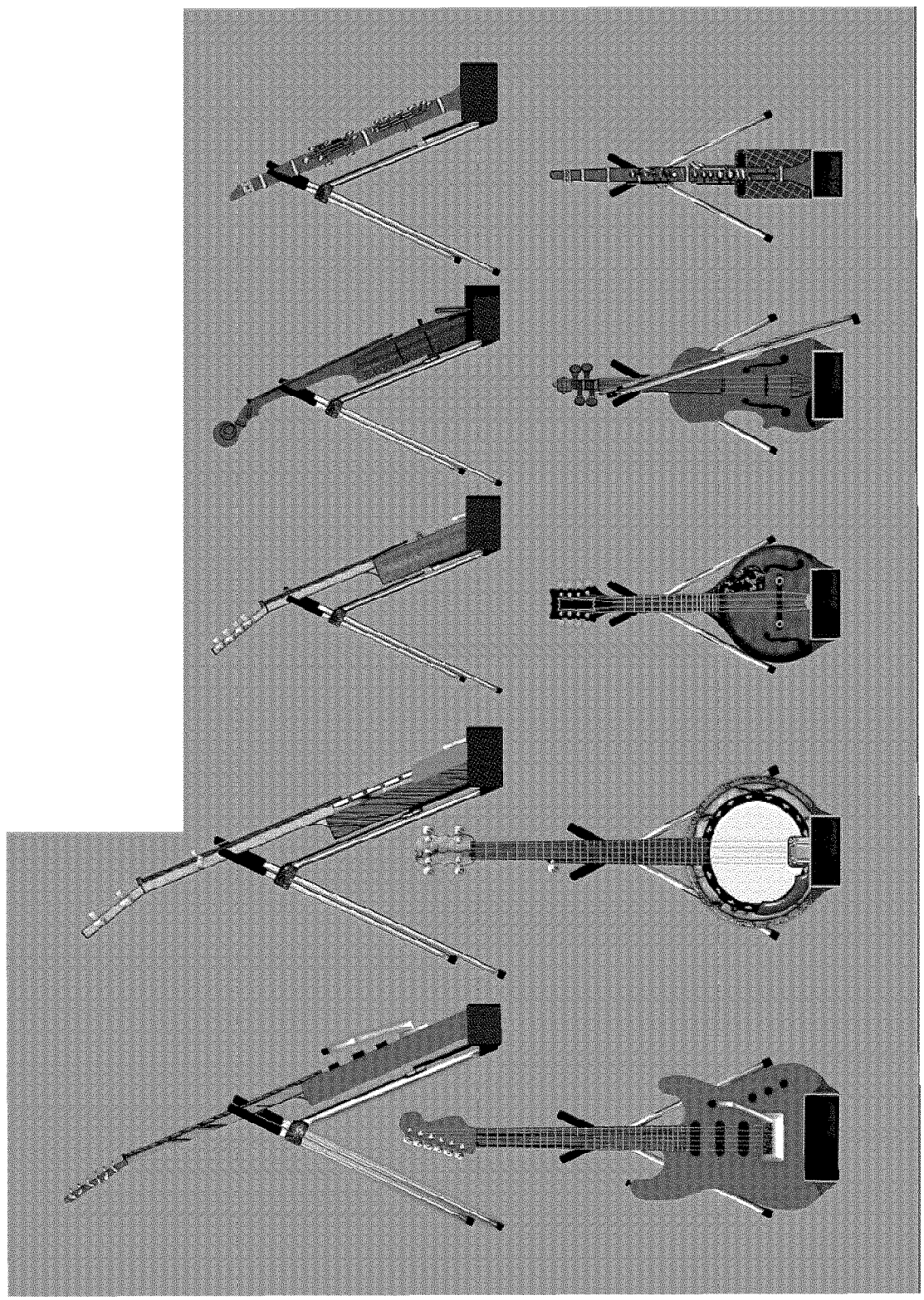

FIG. 5 is a rendering illustrating apparatus according to embodiments of the present disclosure supporting instruments of different sizes and shapes.

DETAILED DESCRIPTION

The following describes examples of collapsible stands for supporting a variety of musical instruments. Example embodiments described below comprise three collapsible "tent-style" poles pivotally attached to a central block in a tripod configuration. In the illustrated examples, a front leg, which is shorter than the other two legs, has a top end that terminates in the support block and a bottom end that is received in a support that holds the base of the instrument (e.g. the body of a guitar). The two longer rear legs, when extended, extend upward beyond the support block and can move between a splayed and a folded position in the central block. When the two longer legs are in the splayed position, they are separated at the bottom and crossed at the top, and the crossed upper portions of the rear legs provide support for the upper portion of the instrument (e.g. the neck of a guitar).

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figures 1, 1A, 1B:
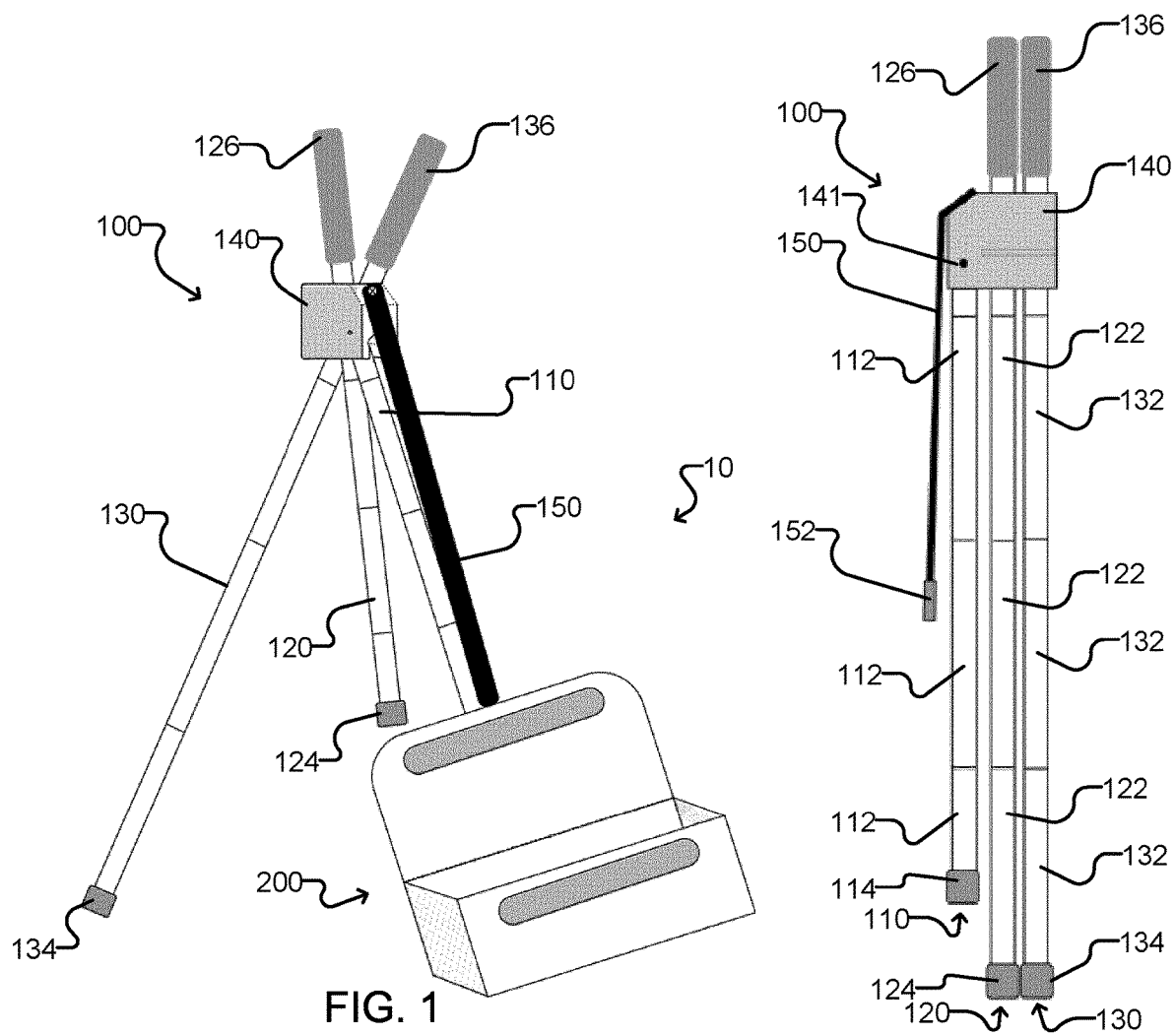
FIG. 1 shows an apparatus for supporting musical instruments comprising a foldable and collapsible stand and a case according to one embodiment of the present disclosure, with the legs in a splayed configuration and the case attached to the stand to act as a base.
FIG. 1A shows the stand of FIG. 1 with the legs extended and in a folded configuration.
FIG. 1B shows the stand of FIG. 1 with the legs collapsed for storage in the case.

FIG. 1 shows an example musical instrument support apparatus 10 comprising a stand 100 with three legs 110, 120, 130 pivotally attached to a center block 140. A case 200 is attached to the bottom of a forward leg 110 and configured to hold the base of a musical instrument. The term "forward"

and related directional terms are used herein to refer to the direction toward a musical instrument held by the stand, and the term "rear" and related directional terms are used herein to refer to the direction away from a musical instrument held by the stand. A strap 150 is connected between the case 200 and the support block 140. The legs 110, 120, 130 are foldable between a splayed configuration shown in FIG. 1, and a folded configuration shown in FIG. 1A.

Each leg 110, 120, 130 preferably comprises a collapsible "tent-pole" style leg with a plurality of leg segments 112, 122, 132 held together by a stretchable cord 111, such that the stand 100 may be collapsed for storage in the case 200, as shown in FIG. 1B. The strap 150 may be wrapped around the leg segments 112, 122, 132 when collapsed to hold the stand 100 in a compact configuration for insertion into the case 200. In other embodiments, the legs may comprise other types of collapsible poles, such as for example telescoping poles.

Each leg 110, 120, 130 has a foot 114, 124, 134 at the bottom end thereof. The foot 114 of the forward leg 110 is configured to be coupled to the case 200, as described below. The feet 124, 134 of the rear legs 120, 130 are configured to abut the ground.

The upper ends of the rear legs 120, 130 extend upwardly past the support blocks, and comprise an instrument rest portion 126, 136 for holding the upper portion of the instrument (e.g. the neck of a guitar). When the stand 100 is in the splayed configuration shown in FIG. 1, the upper ends of the rear legs 120, 130 cross such that the instrument rest portions 126, 136 form a "V" for receiving the instrument.

Details of an example center block 140 are shown in FIGS. 2 and 2A-2F. FIG. 2 shows the positions of the rear legs 120, 130 in relation to the center block 140 in the splayed configuration (solid lines) and in the folded configuration (dotted lines). The center block is preferably constructed from a resilient material that may be slightly deformed by movement of the legs 110, 120, 130, and defines a plurality of apertures configured to hold each leg in either the folded or splayed configuration, as described further below.

As best seen in FIGS. 2A, 2B and 2D, the center block 140 comprises first, second and third apertures 142, 144, 146 for receiving legs 110, 120, 130, respectively. The first aperture 142 comprises a first bore (seen in FIG. 2B) facing generally downwardly for holding the leg 110 in the folded configuration, and a second bore (seen in FIG. 2D) which is at a forward angle to the first bore for holding the leg 110 in the splayed configuration, such that the first leg 110 can be displaced forwardly to move from the folded configuration to the splayed configuration. Each of the second and third apertures 144/146 likewise comprises a first bore (indicated with the dashed circles in FIG. 2A) facing generally downwardly for holding the leg 120/130 in the folded configuration, and a second bore (seen in FIG. 2D) which is at a lateral angle to the first bore for holding the leg 120/130 in the splayed configuration, such that the legs 120, 130 can be displaced laterally to move from the folded configuration to the splayed configuration. The forward leg 110 is pivotally mounted in the center block by a first pin 141, and the rear legs 120, 130 are pivotally mounted in the center block by a second pin 149.

As noted above, the center block 140 is formed from a material that is slightly deformable. For example, in some embodiments the center block 140 is constructed from an Acetal resin, such as Delrin™, and the first, second and third apertures 142, 144, 146 may be machined from a solid block of such material, the center block 140 and apertures 142, 144 146 may be formed by injection molding, or the apertures 142, 144, 146 may be formed by any other suitable process. The first and second bores of each of the first, second and third apertures 142, 144, 146 are sized to snugly fit the cross section of the respective leg 110, 120, 130, and an intermediate portion between the first and second bores of each of the first, second and third apertures 142, 144, 146 is slightly smaller than the respective leg 110, 120 130, such that the material of the center block 140 deforms slightly as the legs 110, 120, 130 move between the folded and splayed configurations. The legs 110, 120, 130 thus tend to "snap" into place into one of the folded or splayed configurations, and a user can readily move the legs 110, 120, 130 between the folded and splayed configurations by pushing them together or pulling them apart.

FIGS. 3-3D show details of an example case 200. Case 200 comprises a base panel 202, a front panel 204, two lateral side panels 206, a rear panel 208 and a lid 210 attached to the rear panel 208. The side panels 206 are preferably constructed from a stretchable fabric material such that they stretch to conform to the base of a musical instrument (e.g. the body of an electric guitar or bass). A cushioning insert 203 (which may be constructed from a foam material of any suitable compressibility selected based on the instrument(s) to be supported) may be provided atop the base panel 202. Cooperating closure members 212 and 214 are mounted on the lid 210 and the front panel 204. For example, the case 200 may comprise a Velcro™ fastener with a soft "loop" portion as member 212 and a rough "hook" portion as member 214. A rubber base 222 may be attached to the bottom of the base panel 202. The rubber base 222 is configured to sit directly on the ground, such that the base of a musical instrument supported by the stand 100 rests stably in the case 200. The combined height of the rubber base 222, base panel 202 and insert 203 may be configured such that when an electric guitar or bass is held in the case 200, a patch cord attached to the body of the guitar/bass is held just off the ground, and further stretches one of the side panels 206.

A leg pouch 224 is provided on the rear panel 208 for receiving the foot 114 of the front leg 110. In some embodiments, the foot 114 of the front leg may be paddle-shaped, such that the foot 114 fits snugly into the leg pouch 224 and the case 200 will not rotate about the front leg 110. In some embodiments, the segments 112 of the front leg 110 may have non-circular (e.g. hexagonal) cross sections, or other suitable structures such as grooves, notches, or the like, such that the segments 112 of the front leg 110 will not rotate with respect to one another.

A female clip portion 226 may be mounted on the lid 210, and configured to receive a male clip portion 152 on the strap 150.

As shown in FIGS. 4 and 5, the sizes of the stand 100 and case 200 may be adjusted to accommodate musical instruments with a variety of sizes and shapes. For example, FIG. 4 shows three example musical instrument support apparatus 10A, 10B and 10C. Apparatus 10A is configured to support larger-sized instruments such as electric guitars or basses, and may have an assembled height of about 58 cm. Apparatus 10B is configured to support medium-sized instruments such as violins or mandolins, and may have an assembled height of about 48 cm. Apparatus 10C is configured to support smaller-sized instruments such as clarinets, flutes recorders, oboes or piccolos, and may have an assembled height of about 38 cm. In other embodiments, the musical instrument support apparatus may be provided with a larger case for supporting instruments with larger bodies, such as for example acoustic guitars or basses.

The present disclosure may be embodied in other specific forms without departing from its spirit or essential characteristics. The described embodiments are to be considered in all respects only as illustrative and not restrictive.

The invention claimed is:

1. Apparatus for supporting a musical instrument comprising:
   a stand comprising:
      a plurality of collapsible legs comprising a forward leg and two rear legs, each of the collapsible legs comprising a top end and a bottom end; and
      a center block having a plurality of apertures for receiving the collapsible legs; and
   an instrument support attached to the bottom end of the forward leg,
   wherein the collapsible legs are pivotally attached to the center block and held within the apertures, and the apertures are shaped such that the legs are moveable between a folded configuration and a splayed arrangement wherein the bottom ends of the rear legs are laterally displaced and the bottom end of the forward leg is forwardly displaced,
   wherein each collapsible leg comprises a plurality of leg segments with a stretchable cord running therethrough, and
   wherein the instrument support comprises a case for carrying the stand.

2. The apparatus of claim 1 wherein the case comprises a leg pouch configured to receive the bottom end of the forward leg.

3. The apparatus of claim 2 wherein the bottom end of the forward leg is paddle-shaped such that the forward leg is non-rotatable with respect to the case when the bottom end of the forward leg is inserted into the leg pouch.

4. The apparatus of claim 1 comprising a strap releasably connectable between the center block and the case.

5. The apparatus of claim 4 wherein the case comprises a base configured to sit directly on the ground.

6. Apparatus for supporting a musical instrument comprising:
   a stand comprising:
      a plurality of legs comprising a forward leg and two rear legs, each of the collapsible legs comprising a top end and a bottom end; and
      a center block having a plurality of apertures for receiving the legs;
   wherein the legs are pivotally attached to the center block and held within the apertures, and the apertures are shaped such that the legs are moveable between a folded configuration and a splayed arrangement wherein the bottom ends of the rear legs are laterally displaced and the bottom end of the forward leg is forwardly displaced, and
   wherein the top ends of the two rear legs extends upwardly past the center block and cross when in the splayed configuration.

7. The apparatus of claim 6 wherein the center block has a first aperture for receiving the forward leg, a second aperture for receiving one of the rear legs, and a third aperture for receiving the other of the rear legs.

8. The apparatus of claim 7 wherein each of the first, second and third apertures comprises a first bore shaped for holding a respective leg in the folded configuration, a second bore at an angle to the first bore and shaped for holding the respective leg in the splayed configuration, and an intermediate portion between the first and second bores shaped slightly smaller than the respective leg such that the material of the center block deforms slightly as the respective leg moves between the folded and splayed configurations.

9. Apparatus for supporting a musical instrument comprising:
   a stand comprising a plurality of legs and a center block having a plurality of apertures for receiving the legs, the plurality of legs comprising a forward leg and two rear legs, each of the legs comprising a top end and a bottom end, wherein the legs are pivotally attached to the center block and held within the apertures, and the apertures are shaped such that the legs are moveable between a folded configuration and a splayed configuration; and
   a case for carrying the stand when the stand is in the folded configuration, the case comprising an instrument support configured to engage the bottom end of the forward leg of the stand when the stand is in the splayed configuration.

10. The apparatus of claim 9 wherein the legs comprise collapsible legs.

11. The apparatus of claim 10 wherein each collapsible leg comprises a telescoping leg.

12. The apparatus of claim 10 wherein each collapsible leg comprises a plurality of leg segments with a stretchable cord running therethrough.

13. The apparatus of claim 12 wherein the plurality of leg segments of the front leg have non-circular cross sections such that such leg segments of the front leg will not rotate with respect to one another.

14. The apparatus of claim 9 wherein the case comprises a leg pouch for receiving the bottom end of the forward leg.

15. The apparatus of claim 14 wherein the bottom end of the forward leg comprises a foot configured and shaped to fit snugly into the leg pouch such that the case will not rotate about the forward leg.

* * * * *